United States Patent [19]

Poppell

[11] 4,336,716
[45] Jun. 29, 1982

[54] WHEEL BALANCING DEVICE AND METHOD

[76] Inventor: Jerry P. Poppell, 3430 Willis Rd., Mulberry, Fla. 33860

[21] Appl. No.: 214,574

[22] Filed: Dec. 8, 1980

[51] Int. Cl.³ ........................................... G01M 1/12
[52] U.S. Cl. ..................................................... 73/480
[58] Field of Search .................. 73/480, 457, 458, 487

[56] References Cited

U.S. PATENT DOCUMENTS

| | | |
|---|---|---|
| 412,360 | 10/1889 | Barclay . |
| 1,744,431 | 1/1930 | Wood ................................. 73/480 |
| 1,763,402 | 6/1930 | Lundgren . |
| 1,774,718 | 9/1930 | McCabe . |
| 1,977,297 | 10/1934 | Weaver . |
| 1,995,061 | 3/1935 | Hanford et al. ...................... 73/480 |
| 2,526,484 | 10/1950 | Jacobsen et al. . |
| 2,613,532 | 10/1952 | Jones . |
| 2,613,533 | 10/1952 | Jones . |
| 2,777,327 | 6/1954 | MacMillan . |
| 3,139,757 | 7/1964 | Egbert . |
| 3,177,725 | 4/1965 | Johnson . |
| 3,595,068 | 7/1971 | Skidmore . |

Primary Examiner—James J. Gill
Attorney, Agent, or Firm—Bell, Seltzer, Park & Gibson

[57] ABSTRACT

The static balancing of a wheel is achieved quickly and in a simplified manner with the use of a scale device which is mounted alongside a rotatably mounted wheel. The scale device comprises an elongate deflectable pointer which is mounted at one end and extends in a cantilever manner alongside the wheel. A scale is mounted alongside the elongate deflectable pointer and indicia is provided on the scale indicating the amount of weight needed to be added to the wheel in order to bring the wheel into balance. A finger is provided which is adapted to be secured to the wheel at a selected circumferential location in relation to the heaviest point on the wheel and having a portion projecting laterally from the wheel for engaging and deflecting the pointer whereby the amount of deflection of the pointer can be read directly from the scale and the amount of weight needed to bring the wheel into balance can be readily determined, thus greatly reducing the amount of time required for balancing the wheel.

6 Claims, 5 Drawing Figures

WHEEL BALANCING DEVICE AND METHOD

This invention relates to a device and method for use in balancing a wheel, and more particularly to a device and method which greatly simplifies and reduces the time involved in balancing a wheel on a static balancing machine.

In balancing a wheel, as for example after a tire has been shaved or trued, weights are attached at various locations around the wheel rim to compensate for uneven weight distribution in the wheel and tire assembly. Selection of the proper amount of weight to attach to the wheel in order to bring the wheel into balance is often done by trial and error, and as such, is relatively time consuming, involving a considerable portion of the overall time required in the balancing operation.

The present invention is directed to a device and method which considerably simplifies and reduces the time required in the wheel balancing operation by quickly giving an indication of the amount of weight needed to bring the wheel into balance.

In accordance with the present invention, a scale device is provided which is used in conjunction with a wheel mounted on a static balancing stand. The scale device includes an elongate deflectable pointer which is mounted so as to extend in a cantilever manner alongside the wheel. A scale is provided alongside the deflectable pointer at a location spaced from the end where the pointer is mounted, with the scale having indicia thereon indicating the amount of weight needed to be added to the wheel in order to bring the wheel into balance. A finger is provided for being secured to the wheel at a selected circumferential location in relation to the heaviest circumferential point on the wheel. The finger includes a clip portion adapted to be readily attached to the wheel rim, and a projecting portion which extends laterally from the wheel for engaging and deflecting the deflectable pointer. The weight of the heavy side of the wheel causes the wheel to rotate so that the finger engages and deflects the pointer, whereby the amount of deflection of the pointer can be read directly from the scale and the amount of weight needed to bring the wheel into balance can be readily determined, thus greatly reducing the amount of time required for balancing the wheel.

In accordance with a preferred aspect of the invention, the indicia which is provided on the scale includes markings calibrated for wheels of different diameters so that the appropriate amount of weight can be readily determined regardless of the size of the wheel being balanced.

In using the scale device in accordance with the method aspects of the invention, the wheel is balanced by mounting the wheel for free rotation about a generally horizontal axis and then rotating the wheel and locating the heaviest circumferential point thereof. A laterally projecting finger is attached to the wheel at a predetermined circumferential location in relation to the heaviest point on the wheel, and a deflectable pointer is positioned alongside the wheel and in the path of the laterally projecting finger. Then, the wheel is allowed to freely rotate so as to move into engagement with the pointer and deflect the pointer. The amount of deflection of the pointer is measured and a weight is selected based on the amount of deflection of the pointer. The weight is attached to the wheel on the side directly opposite the heavy side thereof to thereby balance the wheel.

Some of the features and advantages of the invention having been stated, others will become apparent as the description proceeds, when taken in connection with the accompanying drawings, in which.

Figure 1:
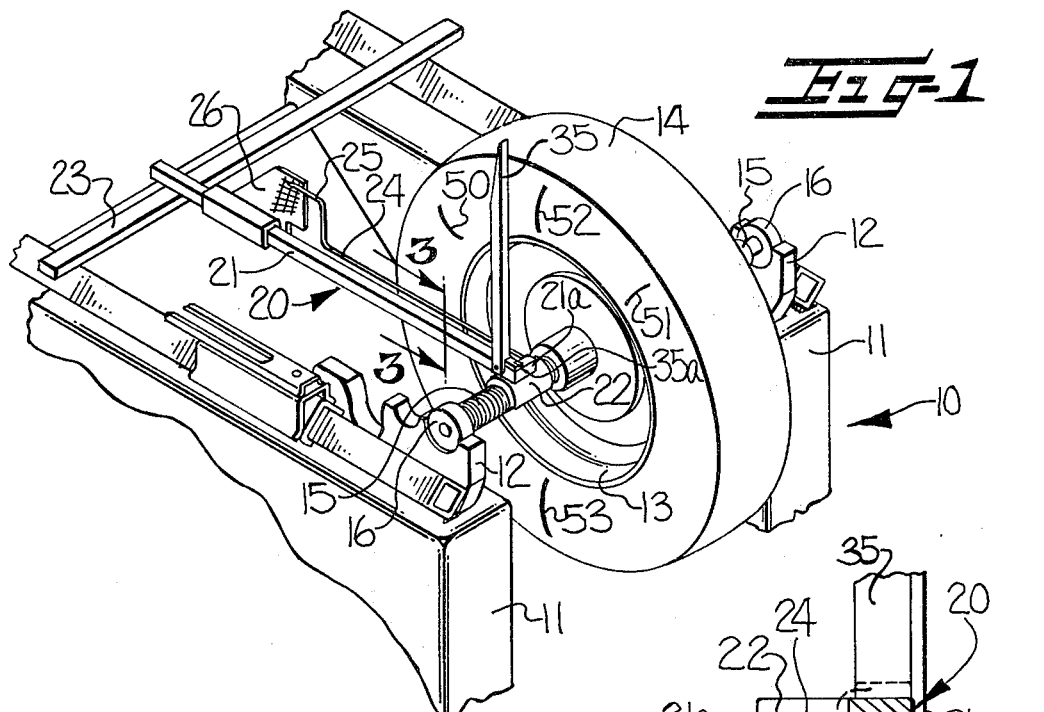
FIG. 1 is a fragmentary perspective view showing a wheel balancing machine with a wheel installed thereon, and also illustrating the static balancing scale device of the present invention.

FIG. 1 illustrates the device of the present invention as applied to a conventional tire truing machine. The truing machine includes a wheel support stand, generally indicated by the reference character 10, in which there is provided a pair of laterally spaced apart base members 11 and respective supports 12 mounted on the upper side of the base members 11. A wheel 13 with a tire 14 mounted thereto is rotatably supported between the base members 11 by laterally projecting mounting shafts 15. Bearings 16 provided at the ends of the shafts 15 are received in the support members 12 and thus provide for free rotation of the wheel 13 about a generally horizontally extending axis.

Figure 3:
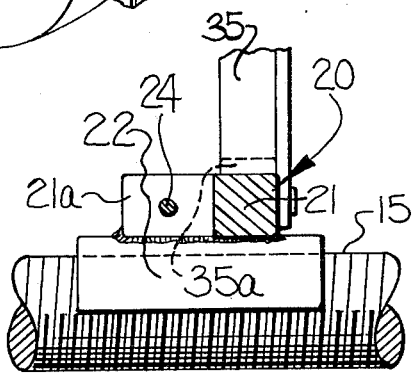
FIG. 3 is a fragmentary cross-sectional view of the scale device taken substantially along the line 3—3 of FIG. 1.

The scale device of the present invention is generally indicated by the reference character 20 and comprises an elongate beam 21 which is mounted alongside the wheel 13. One end of the beam 21 has a laterally projecting leg portion 21a (FIG. 3) and includes a concave support plate 22 which is restingly received on the wheel mounting shaft 15. The opposite end of the beam 21 is supported by suitable means, such as a crossbar 23 extending laterally across the base members 11.

Figure 5:
FIG. 5 is an enlarged elevational view showing the pointer and the scale.

An elongate pointer 24, formed of a resilient deflectable rodlike member, such as a spring steel wire, has one end mounted to the leg portion 21a of beam 21 and extends in a generally cantilever manner laterally alongside the beam 21. In the illustrated embodiment, the free end 25 of the pointer 24 has a pair of bends therein forming an offset. A scale 26 is mounted on the beam 21 adjacent the free end 25 of the pointer. As best seen in FIG. 5, the scale 26 has printed indicia thereon in the form of a series of lines or markings 27. These lines or markings 27 indicate the amount of weight necessary to be added to the wheel in order to bring the wheel into proper static balance.

Figure 2:
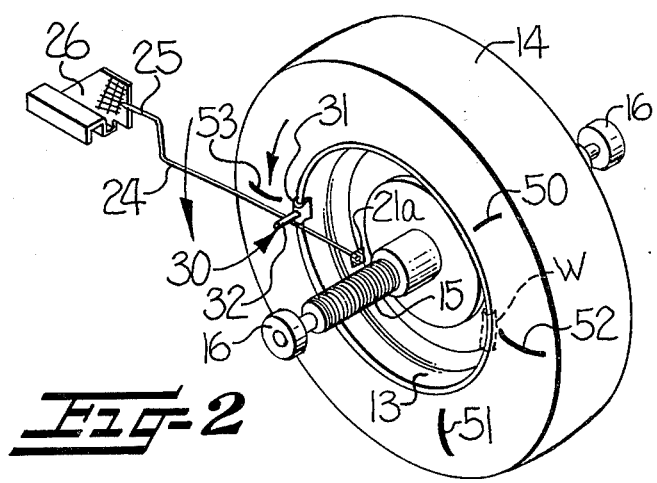
FIG. 2 is a fragmentary perspective view showing how the pointer of the scale device is engaged and deflected by the finger.
Figure 4:
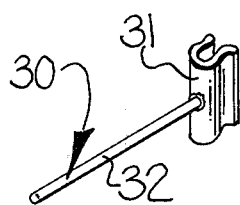
FIG. 4 is an enlarged perspective view of the finger.
Figure 4:
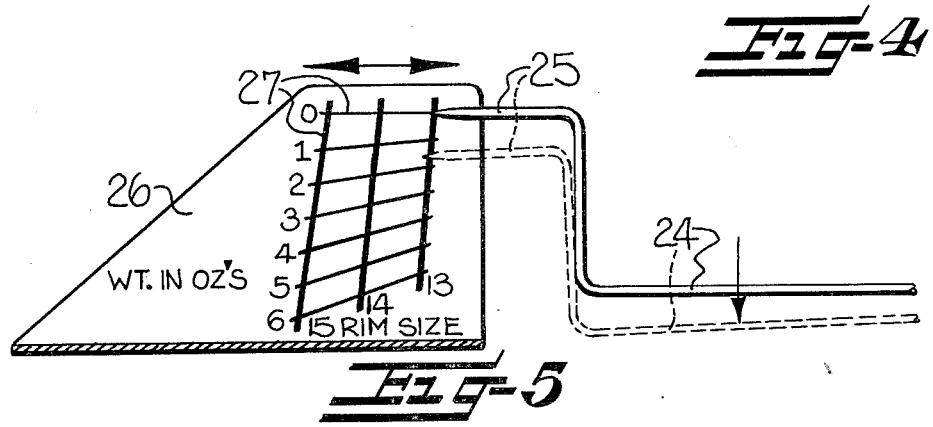

In using the device, the heaviest circumferential point on the wheel is first located, by following the procedure to be described hereinafter, and a finger, generally indicated at 30 (FIG. 4) is mounted for rotational movement with the wheel at a predetermined circumferential location in relation to the heaviest point on the wheel. This particular circumferential location could be the lightest point on the wheel or some other predetermined location with respect to the heaviest point on the wheel, but in the preferred embodiment illustrated herein it has been found most convenient to mount the finger at the circumferential location which corresponds to the heaviest point on the wheel. In the illustrated embodiment the finger is mounted onto the wheel rim, and to this end, the finger 30 includes a clip portion 31 which is adapted to snap onto the wheel rim and a rodlike projecting portion 32 which is carried by the clip. When so installed on the wheel, the finger 30 projects laterally away from the wheel generally parallel to the axis of rotation and is adapted to engage the deflectable pointer 24, as seen in FIG. 2. The weight of the heavy side of the wheel causes the wheel to rotate so that the finger 30 engages and pushes the deflectable pointer 24 downwardly, deflecting it out of its normal position. While the drawings show the finger being mounted directly to the wheel, it is contemplated that the finger could be mounted for movement with the wheel in other ways, as for example by mounting the finger to a member which, in turn, is connected to the wheel. As seen in FIG. 5, the solid lines show the normal position of the pointer 24. When deflected by the finger 30, the pointer 24 is moved downwardly as indicated by the broken lines. The amount of deflection of the pointer can be readily ascertained from the scale 26, and based on the markings on the scale, the appropriate amount of weight needed to bring the wheel into balance can be readily ascertained.

It will be appreciated that the amount of deflection is dependent not only upon the weight of the heavy side of the wheel, but is also dependent upon the distance between where the finger 30 engages the pointer and where the pointer is mounted. This distance or lever arm will vary depending upon the size of the wheel which is being balanced, with larger diameter wheels providing a greater distance or lever arm between the finger and the mounting of the pointer 24. As seen in FIG. 5, the indicia provided on the scale 26 includes markings 27 calibrated for wheels of different diameters, such as for example 13 inch, 14 inch and 15 inch rim sizes.

The device also includes an elongate upright bar 35 which is used as a reference point as will be described more fully hereinafter. This upright bar is pivotally connected to the beam 21 and can be moved from the upright operative position shown in FIG. 1 to a folded storage position located alongside the beam 21. A projecting leg or tab 35a serves as a stop to hold the bar in an upright position.

METHOD OF BALANCING

In balancing a wheel in accordance with this invention, the first step is to locate the heaviest point on wheel. This is accomplished by first mounting the wheel and its tire for free rotation on the stand 10 and positioning the scale device 20 of the present invention alongside the wheel with the reference bar 35 in the upright position as shown in FIG. 1. Then the wheel is allowed to freely rotate. On its first oscillation, as soon as the wheel stops to go in the opposite direction, a chalk mark 50 is made on the tire alongside the vertical reference bar 35. Then the wheel is allowed to continue to rotate until it again stops and begins to reverse direction, at which time another chalk mark 51 is made on the tire alongside the vertical reference bar 35. Now the wheel is stopped and is manually rotated so that the two chalk marks 50, 51, are equidistantly spaced on opposite sides of the reference bar 35, and a third chalk mark 52 is made on the tire alongside the reference bar 35. This third chalk mark 52 is halfway between the smaller arc defined between marks 50, 51 and represents the "top dead center" of the wheel and tire assembly. This represents the light side of the wheel. Next, a point exactly 180° opposite the top dead center mark 52 is located, and may optionally be indicated by an additional chalk mark 53. This point represents the heaviest circumferential point on the wheel.

At this time, the indicator 35 may be folded down alongside the beam 21, as it will no longer be needed. A finger 30 is snapped onto the wheel rim at the heavy side of the wheel, i.e. adjacent the chalk mark 53. The wheel is then manually rotated so that the finger 30 is positioned above the pointer 24. The wheel is then allowed to freely rotate downwardly until the finger 30 engages the pointer 24 and the wheel comes to rest. The finger 30 will thus cause the pointer 24 to be deflected downwardly, as indicated in FIG. 5 by the broken lines. The amount of weight can be read directly from the scale 26. The necessary weight W (FIG. 2) or weights are attached to the wheel rim in alignment with the top dead center mark 52 previously determined, and the wheel will then be in balance.

It will be readily appreciated by those skilled in the art that while the drawings and the foregoing description have illustrated and described the present invention as applied to the balancing of automotive wheels and tires, this invention is equally applicable to other types of wheels and rotative bodies which require static balancing. It should therefore be understood that the drawings and specification have set forth a preferred embodiment of the invention, and although specific terms are employed, they are used in a generic and descriptive sense only and not for purposes of limitation.

That which is claimed is:

1. A device to facilitate the static balancing of a wheel which is mounted for free rotation about a generally horizontally extending axis, said device comprising
    an elongate deflectable pointer,
    means cooperating with one end of said pointer for mounting the pointer so as to extend in a cantilever manner alongside the wheel,
    a scale mounted to cooperate with the elongate deflectable pointer at a location spaced from said one end thereof and having indicia thereon indicating the amount of weight needed to be added to the wheel in order to bring the wheel into balance, and
    a finger adapted to be secured to the wheel at a selected circumferential location in relation to the heaviest point on the wheel and having a projecting portion extending laterally from the wheel for engaging and deflecting said pointer whereby the amount of deflection of the pointer can be read directly from the scale and the amount of weight needed to bring the wheel into balance can be readily determined, thus greatly reducing the amount of time required for balancing the wheel.

2. A device as set forth in claim 1 wherein said elongate deflectable pointer comprises an elongate resilient rod-like member, and wherein said scale is mounted adjacent the free end of said rod-like member.

3. A device as set forth in claim 1 wherein the indicia provided on said scale includes markings calibrated for wheels of different diameters.

4. In a wheel balancing apparatus comprising a wheel, a mounting shaft carried by said wheel and projecting axially from opposite sides of the wheel, and means cooperating with said mounting shaft for supporting the wheel for free rotation about a generally horizontally extending axis, the combination therewith of a device to facilitate the static balancing of the wheel, said device comprising
- an elongate beam extending alongside said wheel, one end of said beam resting on and being supported by said mounting shaft,
- means for supporting the opposite end of said beam so as to maintain the beam in a generally horizontally extending orientation located alongside the rotatably mounted wheel,
- an elongate resilient deflectable pointer,
- means cooperating with one end of said pointer for mounting the pointer to said beam so as to extend in a cantilever manner alongside said beam and alongside the wheel,
- a scale carried by said beam and mounted to cooperate with the elongate deflectable pointer at a location spaced from said one end thereof, and having indicia thereon indicating the amount of weight needed to be added to the wheel in order to bring the wheel into balance, and
- a finger secured to said wheel at a selected circumferential location in relation to the heaviest point on the wheel, said finger including a clip for mounting to the rim of said wheel and a rod portion carried by the clip and projecting laterally from the wheel for engaging and deflecting said pointer whereby the amount of deflection of the pointer can be read directly from the scale and the amount of weight needed to bring the wheel into balance can be readily determined, thus greatly reducing the amount of time required for balancing the wheel.

5. A device as set forth in claim 4 including an elongate vertically extending bar positioned alongside said wheel and adapted to serve as a reference point at the top of the wheel, and means pivotally connecting said bar to said beam to permit movement of the bar from a vertical upright position to a horizontal storage position alongside said beam.

6. A method for static balancing a wheel comprising mounting the wheel for free rotation about a generally horizontally extending axis, rotating the wheel and locating the heaviest circumferential point on the wheel, mounting a laterally projecting finger for rotational movement with the wheel at a selected circumferential location in relation to the heaviest point on the wheel, positioning a deflectable pointer alongside the wheel and in the path of the laterally projecting finger, allowing the wheel to freely rotate and to move the finger into engagement with the pointer deflecting the pointer, measuring the amount of deflection of the pointer, selecting a weight based on the amount of deflection of the pointer, and attaching the weight to the wheel opposite the heaviest point thereof to thereby balance the wheel.

* * * * *